United States Patent
McDonnell

(10) Patent No.: US 7,450,576 B2
(45) Date of Patent: Nov. 11, 2008

(54) TIMESLOT ASSIGNMENT

(75) Inventor: Niall D. McDonnell, Limerick (IE)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 10/716,376

(22) Filed: Nov. 17, 2003

(65) Prior Publication Data

US 2005/0105546 A1 May 19, 2005

(51) Int. Cl.
*H04L 12/50* (2006.01)
(52) U.S. Cl. ...................... 370/376; 370/383

(58) Field of Classification Search ............... 370/389, 370/376, 363, 368, 371, 374, 378, 379, 381, 370/382, 429, 458, 471, 473, 360, 352–358, 370/383
See application file for complete search history.

(56) References Cited

U.S. PATENT DOCUMENTS 6,931,002 B1 * 8/2005 Simpkins et al. ............ 370/354

* cited by examiner

*Primary Examiner*—Brenda Pham
(74) *Attorney, Agent, or Firm*—Fish & Richardson P.C.

(57) ABSTRACT

An apparatus and method includes receiving frames from multiple channels, each frame partitioned into multiple timeslots, reading a timeslot lookup table including an entry that specifies an assignment associated with each timeslot, and storing the data associated with a particular timeslot in a memory location based on the assignment.

23 Claims, 6 Drawing Sheets

FIG. 3

Data Frame A 24a

| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (d) |
| Timeslot 9 (d) |
| Timeslot 10 (u) |
| Timeslot 11 (v) |
| Timeslot 12 (u) |
| Timeslot 13 ... |
| ... |
| Timeslot 31 |
| Timeslot 32 |

Data Frame B 24b

| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (d) |
| Timeslot 9 (d) |
| Timeslot 10 (u) |
| Timeslot 11 (v) |
| Timeslot 12 (u) |
| Timeslot 13 ... |
| ... |
| Timeslot 31 |
| Timeslot 32 |

Data Frame C 24c

| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (d) |
| Timeslot 9 (d) |
| Timeslot 10 (u) |
| Timeslot 11 (v) |
| Timeslot 12 (u) |
| Timeslot 13 ... |
| ... |
| Timeslot 31 |
| Timeslot 32 |

Data Frame D 24d

| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (d) |
| Timeslot 9 (d) |
| Timeslot 10 (u) |
| Timeslot 11 (v) |
| Timeslot 12 (u) |
| Timeslot 13 ... |
| ... |
| Timeslot 31 |
| Timeslot 32 |

Data Buffer Table 84

| Word Address | Byte 0 | Byte 1 | Byte 2 | Byte 3 |
|---|---|---|---|---|
| 0x510 | ... | ... | ... | ... |
| 0x50C | C.9 | D.7 | D.8 | D.9 |
| 0x508 | B.8 | B.9 | C.7 | C.8 |
| 0x504 | A.7 | A.8 | A.9 | B.7 |
| 0x500 | A.3 | B.3 | C.3 | D.3 |

Voice Buffer Table 86

| Word Address | Byte 0 | Byte 1 | Byte 2 | Byte 3 |
|---|---|---|---|---|
| 0x414 | ... | ... | ... | ... |
| 0x410 | A.11 | B.11 | C.11 | D.11 |
| 0x40C | A.6 | B.6 | C.6 | D.6 |
| 0x408 | A.2 | B.2 | C.2 | D.2 |
| 0x404 | A.1 | B.1 | C.1 | D.1 |
| 0x400 | A.0 | B.0 | C.0 | D.0 |

Voice Buffer Table 88

| Word Address | Byte 0 | Byte 1 | Byte 2 | Byte 3 |
|---|---|---|---|---|
| 0x414 | ... | ... | D.1 | ... |
| 0x410 | C.2 | D.0 | ... | C.1 |
| 0x40C | ... | C.6 | C.0 | ... |
| 0x408 | B.1 | B.0 | B.6 | B.11 |
| 0x404 | A.11 | ... | ... | B.0 |
| 0x400 | A.0 | A.1 | A.2 | A.6 |

| Data Frame A 24a |
|---|
| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (u) |
| Timeslot 9 (d) |
| Timeslot 10 (u) |
| Timeslot 11 (v) |
| Timeslot 12 (d) |
| Timeslot 13 ... |
| ... |
| Timeslot 31 |
| Timeslot 32 |

| Data Frame B 24b |
|---|
| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (u) |
| Timeslot 9 (d) |
| Timeslot 10 (u) |
| Timeslot 11 (v) |
| Timeslot 12 (d) |
| Timeslot 13 ... |
| ... |
| Timeslot 31 |
| Timeslot 32 |

| Data Frame C 24c |
|---|
| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (u) |
| Timeslot 9 (d) |
| Timeslot 10 (u) |
| Timeslot 11 (v) |
| Timeslot 12 (d) |
| Timeslot 13 ... |
| ... |
| Timeslot 31 |
| Timeslot 32 |

| Data Frame D 24d |
|---|
| Timeslot 0 (v) |
| Timeslot 1 (v) |
| Timeslot 2 (v) |
| Timeslot 3 (d) |
| Timeslot 4 (u) |
| Timeslot 5 (u) |
| Timeslot 6 (v) |
| Timeslot 7 (d) |
| Timeslot 8 (u) |
| Timeslot 9 (d) |
| Timeslot 10 (u) |
| Timeslot 11 (v) |
| Timeslot 12 (d) |
| Timeslot 13 ... |
| ... |
| Timeslot 31 |
| Timeslot 32 |

Data Table 120

| Word Address | Byte 0 | Byte 1 | Byte 2 | Byte 3 |
|---|---|---|---|---|
| 0x510 | ... | ... | ... | ... |
| 0x50C | C.9 | D.7 | D.8 | D.9 |
| 0x508 | B.8 | B.9 | C.7 | C.8 |
| 0x504 | A.7 | A.8 | A.9 | B.7 |
| 0x500 | A.3 | B.3 | C.3 | D.3 |

Voice Table 122

| Word Address | Byte 0 | Byte 1 | Byte 2 | Byte 3 |
|---|---|---|---|---|
| 0x414 | ... | ... | ... | ... |
| 0x410 | A.11 | B.11 | C.11 | D.11 |
| 0x40C | A.6 | B.6 | C.6 | D.6 |
| 0x408 | A.2 | B.2 | C.2 | D.2 |
| 0x404 | A.1 | B.1 | C.1 | D.1 |
| 0x400 | A.0 | B.0 | C.0 | D.0 |

FIG. 5

TIMESLOT ASSIGNMENT

BACKGROUND

In time division multiplexed protocols a frame includes a serial stream of bits partitioned into a number of eight bit timeslots. For example, a frame can include 32 timeslots for a total of 256 bits. Each timeslot may represent a single communications channel. In a communications processor, it is usually necessary to process data from each channel separately. In some cases, a frame includes data, voice, and unassigned timeslots.

DESCRIPTION OF DRAWINGS

FIG. 3 is a block diagram of timeslot placement in a data buffer and a voice buffer.

FIG. 5 is a block diagram of timeslot placement in a data buffer and a voice buffer.

DESCRIPTION

Figure 1:
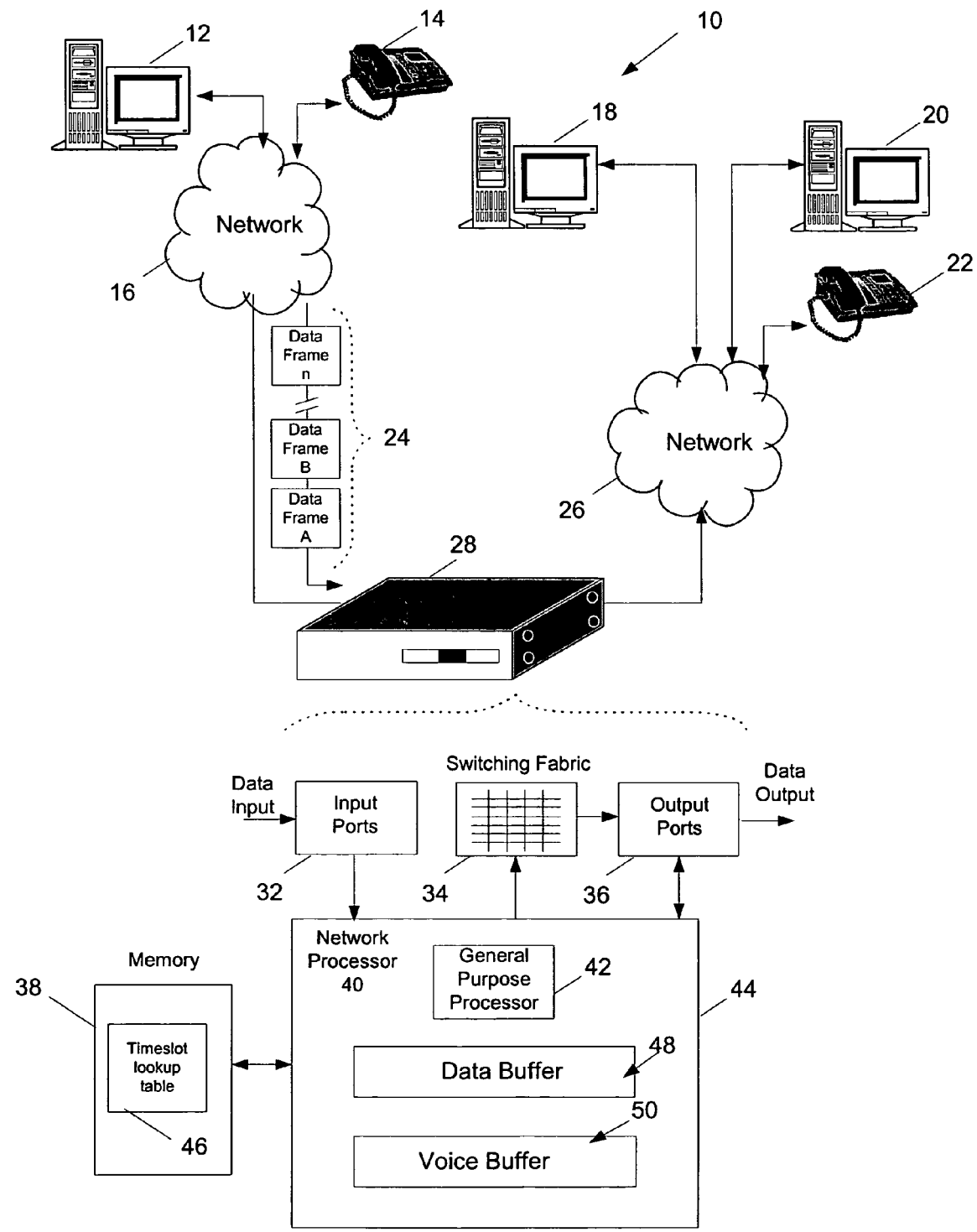
FIG. 1 is a block diagram depicting a system for processing data frames.

Referring to FIG. 1, a system 10 for transmitting data frames from a computer system 12 or voice system 14 through a network 16 to other computer systems 18 and 20 or voice system 22, the system 10 includes a router 28 that collects a stream of "n" data frames 24, classifies each of the data frames as an aggregation of timeslots from various channels, for transmission through the network 20 and delivery to the appropriate destination computer system 16, computer system 18, or voice system 17. For example, in time division multiplexed (TDM) protocols such as T1/E1 frame includes of a serial stream of bits partitioned into a number of 8 bit timeslots. An E1 frame includes 32 timeslots for a total of 256 bits. Each timeslot may represent a single communications channel, for example, a telephone call. A frame (e.g., data frame A) includes both voice and data for delivery to the appropriate destination and can also include unassigned timeslots. Typically, a router 28 receives the data frames 24 on one or more input ports 32 that provide a physical link to the network 16. The router 28 passes the frames 24 to the network processor 40 that controls the entering of the incoming data frames 24. Typically, the network processor 40 processes and passes the data frames 24 to a switching fabric 34 that connects to output ports 36. However, in some arrangements, the router 28 does not include the switching fabric 34 and the network processor 40 directs the data frames to the output ports 36. The output ports 36, which are also in communication with the network processor 40, are used for scheduling transmission of the data to the network 26 for reception at the appropriate computer system 18 or 20 or voice system 22.

To schedule the transmission of the data included in the timeslots of each frame, the network processor 40 determines one or more destinations (e.g., computer system 18, 20, etc.) to send each of the timeslots. In order to send the data to the appropriate destination a timeslot lookup table 46 is included in a memory 38. The timeslot lookup table 46 defines the assignment of timeslots according to type, for example voice, data, and unassigned. A data timeslot can be defined as a start of channel (SOC) timeslot or a continuation of channel (COC) timeslot. A SOC assignment, for example, indicates the first timeslot of a particular data channel while the COC assignment indicates the remaining timeslots in the data channel. According to the type assigned to each timeslot in the timeslot lookup table 46, the processor 40 stores the data in an appropriate buffer. Timeslots with a voice assignment are stored in a voice buffer 50 and timeslots with a data assignment are stored in a data buffer 48. Unassigned timeslots are not stored.

Figure 2:
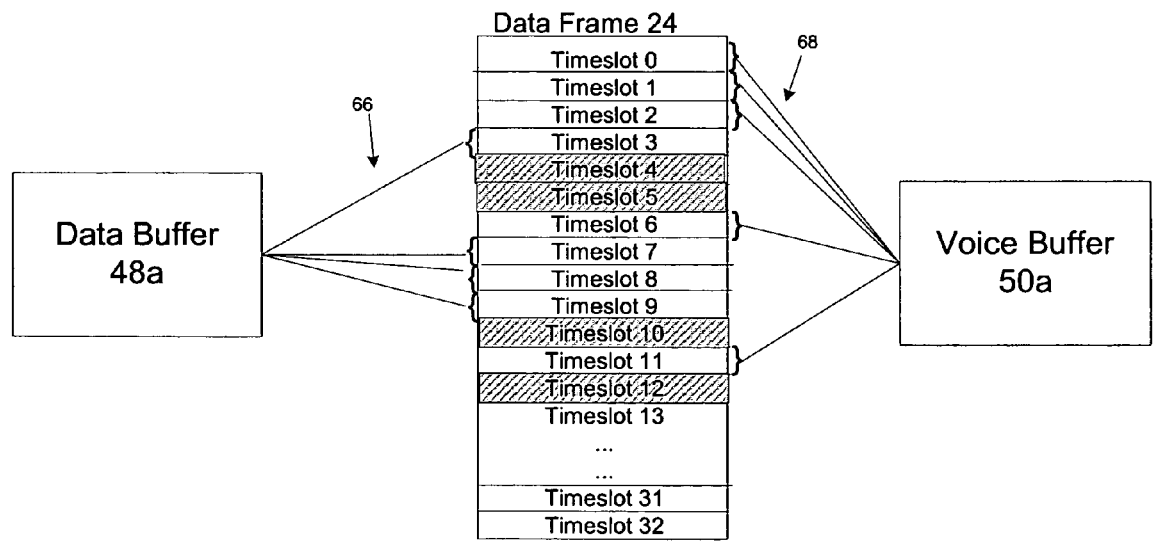
FIG. 2 is a block diagram depicting a frame and a timeslot lookup table.

Referring to FIG. 2, a data frame 24 is partitioned into e.g., thirty-two timeslots. In order to determine the appropriate buffer in which to store the data associated with each timeslot, the timeslot lookup table 46 includes a list 62 of assignments corresponding to a list 60 of timeslots. A listing of the appropriate buffer for each assignment type is stored elsewhere, however, the appropriate buffer is shown for illustrative purposes. The size of the timeslot lookup table is fixed for the protocol (e.g., 32 timeslots for the TDM standard of 2.048 Mbps service (E1)) whereas the size of the buffer lookup depends on the number of channels and the number of timeslots that are assigned. Typically, the timeslot lookup table is a hardware construct while the buffer lookup is a software construct in a memory.

The data frame 24 includes voice and data timeslots. A timeslot lookup table 46a associates an assignment with each timeslot to indicate whether the timeslot includes voice, High-level Data Link Control (HDLC) data, or is unassigned. In this example, timeslots 0, 1, 2, 6, and 11 are assigned as voice, timeslots 3, 7, 8, and 9 are assigned as HDLC data, and timeslots 4, 5, 10, and 12 are unassigned. Based on these assignments, the processor stores timeslots 0, 1, 3, 6, and 11 in voice buffer 50 (indicated by arrows 68), and timeslots 3, 7, 8, and 9 in data buffer 48 (indicated by arrows 66). The processor 40 discards the unassigned timeslots 4, 5, 10, and 12 (indicated by gray shading). The remaining timeslots (e.g. timeslot 13-timeslot 32) are handled in a similar manner.

Referring to FIG. 3, four frames 24a-24d arrive serially to the input port 32. Data from the frames is placed into appropriate memory locations as shown in tables 84, 86, and 88. The four frames (as described in FIG. 2) arrive serially at the communications processor 40: frame 'A' 24a, frame 'B' 24b, frame 'C' 24c, and frame 'D' 24d. Each frame is partitioned into 32 timeslots with the assignments for each timeslot listed in the timeslot lookup table 46a shown in FIG. 2. For convenience, assignments are shown for frames 24a-24c where v=voice, d=HDLC data, and u=unassigned. By examining the timeslot assignment, the processor 40 determines whether to discard the data included in a particular timeslot or store the data in an appropriate memory location in the voice buffer 50 or the data buffer 48. After arriving at the processor 40, four full frames are stored in a block of memory called an "image" to allow processing of 32 bit grouping. Thus, four samples of every timeslot corresponding to the timeslots in frames A-D are stored.

The HDLC data buffer 48 and voice buffer 50 include four bytes (e.g. byte 0, byte 1, byte 2, and byte 3) for each word address as shown in tables 84, 86, and 88. The voice buffer 50 begins at address 0x400 and the HDLC buffer begins at address 0x500 as indicated by arrows 82a-82b and 80 respectively. Each channel of HDLC data is stored together and the ordering of the data in the HDLC channel is maintained by storing the data from a particular channel in consecutive timeslots. In this example, the nomenclature 'A.n' denotes frame 'A', timeslot 'n'. For example, timeslot five of data frame C would be represented as 'C.5'.

HDLC channel '0' (70) includes a single timeslot while HDLC data channel '1' (72) includes a number of contiguous timeslots. The data for each HDLC channel is stored in the data buffer 48 according to Equation 1:

Address=Base Address for Channel+(Frame Number*Channel length)+Channel position.  Equation 1

Equation 1 defines an offset measured from the start of the data buffer 48. 'Base' is a base address for the HDLC channel. The processor calculates the address "Base" to be four (4) times the number of HDLC assigned timeslots in the frame before the current channel. The frame number describes the position of the frame in the sequence of frames, for example, A=0, B=1, C=2, D=3 etc. whereas, the channel length refers to the number of data timeslots in the channel. Channel Position refers to the position of the timeslot in the HDLC channel (for a 3-byte channel, there are 3 positions: 0, 1, 2).

Thus, using the above equation the processor 40 determines an appropriate memory location in which to store the data from each timeslot. As shown in table 46a, the three timeslots for HDLC channel 1 from each frame are stored contiguously in the data buffer 48. For example, the HDLC channel '1' data from frame C (24c) is stored in bytes two and three of word 0x508 and byte one of word 0x50C as indicated by dotted line 100.

For example, the memory location for timeslot 9 of frame B 104 is calculated using "Address=Base+(Frame Number*Channel length)+Channel position." The start of the voice buffer 50 is calculated using PBA and PBO, the values for PBA and PHO are present to be equal to 0x400 (a byte address) and seven (an offset in words), respectively. The value of 0x400 for PBA indicates the voice buffer 50 begins at location 0x400. The PHO value of 7 indicates the data buffer 48 begins at the seventh word in the memory or that there are 6 words stored in the voice buffer 50. Thus, the data buffer 48 begins at 0x41C [0x400+4*0x7=0x41C]. The 'base' parameter is calculated as 4*3, or 4 times the number of data timeslots in the frame previous to this timeslot (e.g. 3). The frame number equals 1 since this is the second frame. The channel length is 3 because HDLC channel includes three timeslots and the channel position is 2 because this is the third data timeslot in the HDLC channel (Channel positions are numbered 0, 1, 2, etc.). Using the equation above, the memory location for timeslot 9 of frame B is: 0x41c+0xC+(1*3)+2=0x42D.

The voice timeslots of the frames are stored in a voice buffer in the address range 0x400-0x41B. For voice, four timeslots (from four successive frames) occupy a 32-bit word. In one example, the voice timeslots are "channelized." Channelized data consists of data originating from a single source stored in the same timeslot in multiple frames. For example, the data for a telephone call can be 'channelized' and all data for the call would be stored in a particular timeslot in consecutive frames. For channelized data, an image in the buffer is composed of data from the same timeslot in different frames as shown in table 86. For example, the four timeslots from each of the four data frames for voice channel 3 are stored in word 0x40C as indicated by dotted line 102. For "channelized" data, the processor uses the following equation to calculate the appropriate memory location in which to store voice data from a particular timeslot:

Address=*PBA*+4*(Voice Channel Number)+Frame Number.  Equation 2

In equation 2, the Port Base Address (PBA) is the starting address for the voice buffer 50, voice channel number is the channel defined in the timeslot lookup table (e.g. timeslot 0=channel 0, timeslot 11=channel 4). Frame number specifies the position of the frame in the sequence of frames, for example, A=0, B=1, C=2, D=3 etc.

For example, the memory location for timeslot two of frame A (104), denoted A.2, is calculated using "Address=PBA+4*(Voice Channel Number)+Frame Number." The value for PBA is present to be equal to 0x400. The channel number is two as defined in the timeslot lookup table. Alternately, counting the number of previous voice timeslots, where the first timeslot is counted as timeslot zero, generates the channel number. The frame number equals zero since frame 'A' 24a is the first frame in the sequence of four frames. Using Equation 2 above, the memory location for timeslot two of frame A (A.2) is 0x408.

If the voice data is not "channelized" the voice timeslots are written to sequential byte addresses in the order the input port 32 receives the data. The result, shown in table 72, is voice data from frame 'A' 24a, which is sequentially stored followed by the data from frame 'B' 24b, and so forth. The ellipses highlighted by dotted line 106 denote the assumption that two or more voice timeslots occur after timeslot 11 before the start of the next frame.

Figure 4:
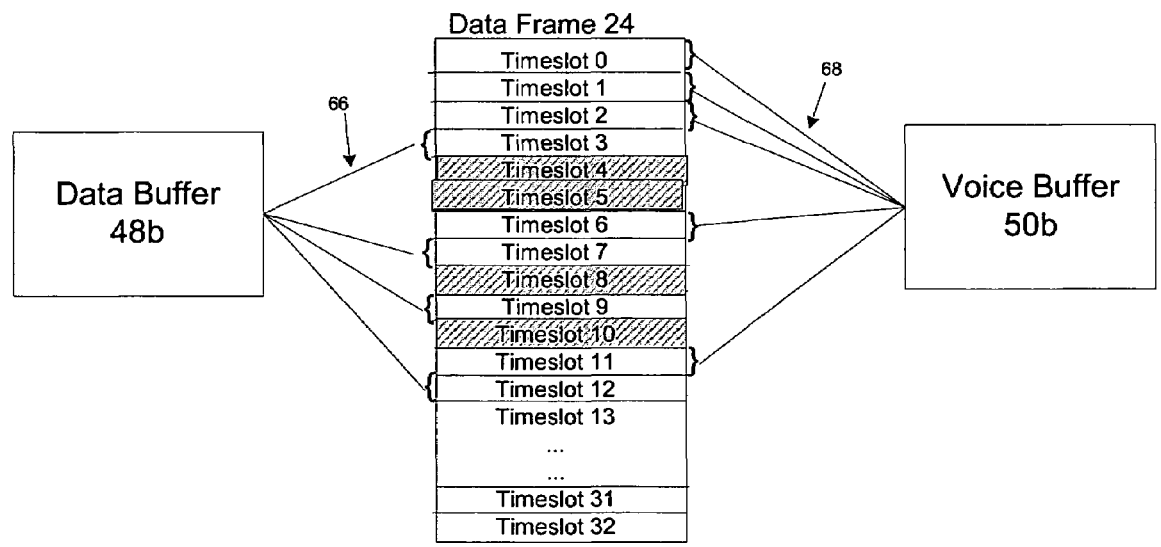
FIG. 4 is a block diagram depicting a frame and a timeslot lookup table.

Referring to FIGS. 4 and 5 a second example of the assignment of memory locations based on a different timeslot lookup table is shown. While in the previous example all data timeslots were contiguous in the arriving frame 24, in this example the data timeslots are not contiguous. However, data timeslots from multiple channels do not overlap but, voice and/or unassigned timeslots can interrupt the data timeslots. As shown in timeslot lookup table 38b, the HDLC data is included in timeslots 3, 7, 9, and 12. In this example, both an unassigned timeslots (e.g. timeslot 10 (120)) and a voice timeslot (e.g. timeslot 11 (122)) separate HDLC 1 data timeslots. Using the equations as described above the processor assigns the voice data to voice buffer 50b and the HDLC data to data buffer 48b as shown in tables 120 and 122.

The calculation of the address for HDLC timeslots requires knowledge of the size (in bytes) of the HDLC channel. It is possible to store this information (e.g. the length of each HDLC channel) in a memory similar to the timeslot lookup table, but this requires a considerable amount of memory to be dedicated to defining the length of a channel. Often a channel includes more than 4 timeslots, therefore at least three bits are needed to define the channel length for each channel. In this example, the "memory" is a hardware construct, thus it can be difficult to define all channel lengths and account for the extreme cases e.g., 31 buffers of length one, one buffer of length 31 etc. Instead, the processor computes the HDLC address for each of HDLC channels as the frames are received. This approach takes advantage of the size of a frame, for example, 32 timeslots, and that the data clock runs at a lower frequency than the system clock.

In order to determine the appropriate memory location the processor 40 determines values for each parameter used in the equation. The PBA and PHO parameters are constants.

Figure 6:
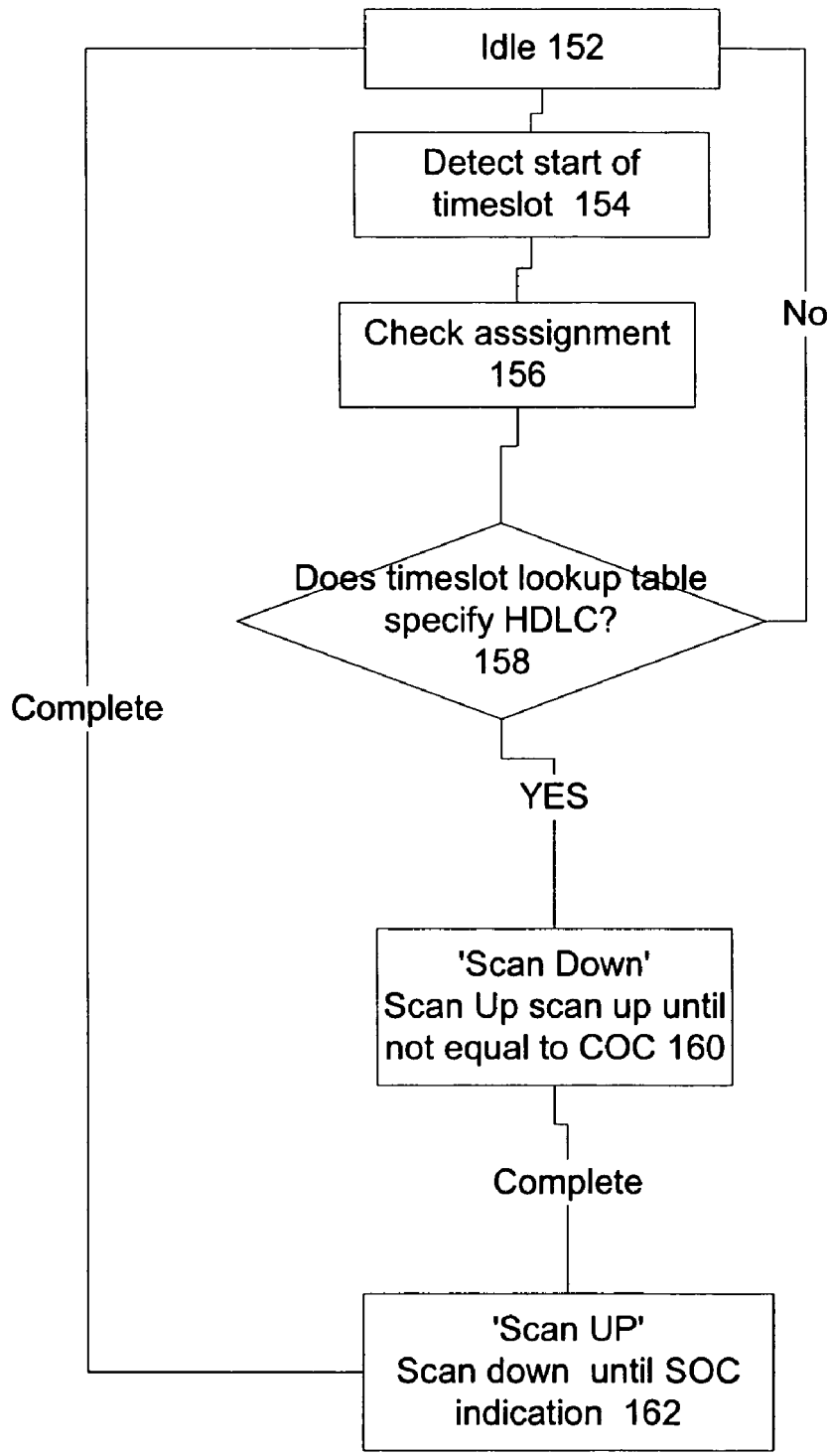
FIG. 6 is a flow chart of a state machine.

Referring to FIG. 6, a process for calculating the base address, position in the channel and length of channel using an HDLC finite state machine (FSM) is shown. The process 150 starts via a reset, or initially in an IDLE state 152. The process detects 154 the start of a new timeslot and moves into an HDLC determination state. Process 150 checks 156 the assignment in the timeslot lookup table 46 and determines 158 if the timeslot includes HDLC data. If the timeslot assignment in the timeslot lookup table is not HDLC data, process 150 returns to the IDLE state 152. If the timeslot assignment is HDLC data, process 150 moves to a 'SCAN DOWN' state that calculates the 'position' parameter. In the 'SCAN DOWN' state the processor counts down (e.g., scans timeslots stored in memory locations prior to the current location) to find a SOC assignment. In the 'SCAN DOWN' state, the process 150 uses a scan counter that scans 160 previous timeslots in succession until reaching a previous 32 timeslot boundary (e.g. start of the frame). When process 150 detects a start of channel (SOC) assignment, process 150 flags the timeslot including the SOC assignment. The process 150 counts HDLC timeslots encountered before the SOC to determine the position of the current timeslot in the channel (e.g., timeslots between the SOC assigned timeslot and the current timeslot). An SOC assignment indicates the first timeslot of an HDLC channel. HDLC timeslots found afterward determine the count of 'previous' HDLC timeslots. When a 32 timeslot boundary is reached the process 150 transitions to a 'SCAN UP' state. In the 'SCAN UP' state the processor counts up (e.g., scans timeslots stored in memory locations subsequent to the current location). In the 'SCAN UP' state, the process 150 scans 162 succeeding timeslots to detect the end of the HDLC channel. Upon encountering any continuation of channel (COC) assignment, the length of the channel is incremented. A COC assignment indicates a timeslot including HDLC that is a continuation of an HDLC channel, thus a COC assignment indicates an HDLC timeslot that is not the first timeslot of an HDLC channel. Upon detecting a new channel (e.g., an SOC assignment) or the end of the 32 timeslot boundary, the machine returns to the IDLE state 152.

The scanning mechanism relies on the system clock operating at a higher frequency than the data clock. Since the scan counter always remains within the same 32 timeslot frame, the scan counter runs for a maximum of 32 clock cycles to scan each timeslot and runs for extra clock cycles for state transitions etc. Based on these clock cycle estimates, an estimate of the total time to calculate the HDLC address is less than 40 system clock cycles.

Since this calculation takes place within the time allocated for a single timeslot it is guaranteed that 40 system clock cycles will elapse in less time than 8 data clock cycles.

The HDLC finite state machine (FSM) calculates the base address, position, and length for a data channel using process 150. The base address for the HDLC channel is the base address for the frame plus the number of HDLC timeslots in the frame 'before' the current channel. The HDLC FSM calculates the position in the channel for every COC timeslot by scanning previous timeslots until an SOC timeslot assignment is found. The length (size) of the channel is calculated for every HDLC timeslot by scanning forward through timeslots in the timeslot lookup table 46, adding timeslots configured COC, until another SOC timeslot is encountered (because HDLC data channels cannot overlap) or the end of the frame is reached.

While in the examples described in relation to FIGS. 2-4, the processor 40 stores the contents of the voice timeslots beginning at memory location 0x400 and the contents of the data timeslots in beginning at 0x500 within a single memory, the voice and data timeslots can be stored at different locations in a single memory or in different memories. If the buffers are moved, the equations used to calculate the memory locations are modified accordingly.

In the preceding examples, the data is described as HDLC data. However, other types of data could be included in the data timeslots.

In the preceding examples, a frame is partitioned into 32 timeslots. However, other frame lengths or partitioning can be used.

The processor described herein can be implemented in digital electronic circuitry, in computer hardware, firmware, software, or in combinations of them. The processor described herein can be implemented as a computer program product, e.g., a computer program tangibly embodied in an information carrier, e.g., in a machine-readable storage device, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims.

What is claimed is:

1. A method comprising:
    receiving frames partitioned into multiple timeslots;
    reading a timeslot lookup table including an entry that specifies an assignment corresponding to a timeslot;
    storing data associated with a particular timeslot in a memory location based on the assignment, with data from a particular channel included in timeslots having a data assignment stored in contiguous memory locations; and
    calculating the number of timeslots associated with a set of data timeslots, wherein calculating the number of timeslots includes locating a start-point and an end-point of a set of data non-consecutive channels in a frame having the same assignment.

2. The method of claim 1 wherein the assignments include a voice timeslot, an unassigned timeslot, and a data timeslot.

3. The method of claim 2 wherein timeslots having a voice assignment or an unassigned timeslot separate the timeslots having a data assignment in the frame.

4. The method of claim 2 wherein storing the data comprises:
    storing the data included associated with voice timeslots in a first memory;
    storing the data associated with data timeslots in a second memory; and
    discarding the data associated with unassigned timeslots.

5. The method of claim 2 wherein storing the data comprises:
    storing the data associated with voice timeslots in a first subset of locations in the memory;
    storing the data associated with data timeslots in a first subset of locations in the memory; and
    discarding the data associated with unassigned timeslots.

6. The method of claim 1 further comprising storing the frames associated with a voice assignment in a memory in the order the frames are received.

7. The method of claim 1 further comprising storing the frames associated with a voice assignment such that all voice assignment frames from a channel for a particular frame are stored contiguously.

8. A computer-readable storage medium having computer program instructions encoded thereon, the computer program instructions when executed by a computer perform operations comprising:
    receiving frames partitioned into multiple timeslots;
    reading a timeslot lookup table including an entry that specifies an assignment corresponding to a timeslot;
    storing data associated with a particular timeslot in a memory location based on the assignment, with data from a particular channel included in timeslots having a data assignment stored in contiguous memory locations; and calculating the number of timeslots associated with a set of data timeslots, wherein calculating the number of timeslots includes locating a start-point and an end-point of a set of data non-consecutive channels in a frame having the same assignment.

9. The computer-readable storage medium of claim 8, wherein the assignments include a voice timeslot, an unassigned timeslot, and a data timeslot.

10. The computer-readable storage medium of claim 9, wherein timeslots having a voice assignment or an unassigned timeslot separate the timeslots having a data assignment in the frame.

11. The computer-readable storage medium of claim 9, wherein storing the data comprises:
   storing the data included associated with voice timeslots in a first memory;
   storing the data associated with data timeslots in a second memory; and
   discarding the data associated with unassigned timeslots.

12. The computer-readable storage medium of claim 9, wherein storing the data comprises:
   storing the data associated with voice timeslots in a first subset of locations in the memory;
   storing the data associated with data timeslots in a first subset of locations in the memory; and
   discarding the data associated with unassigned timeslots.

13. The computer-readable storage medium of claim 8, wherein calculating the number of timeslots includes locating a start-point and an end-point of a set of data non-consecutive channels in a frame having the same assignment.

14. The computer-readable storage medium of claim 8, the operations further comprising storing the frames associated with a voice assignment in a memory in the order the frames are received.

15. The computer-readable storage medium of claim 8, the operations further comprising storing the frames associated with a voice assignment such that all voice assignment frames from a channel for a particular frame are stored contiguously.

16. A system comprising:
   a processor; and
   a computer-readable storage medium having computer program instructions encoded thereon, the computer program instructions causing the processor to perform operations comprising: receiving frames partitioned into multiple timeslots;
   reading a timeslot lookup table including an entry that specifies an assignment corresponding to a timeslot;
   storing data associated with a particular timeslot in a memory location based on the assignment, with data from a particular channel included in timeslots having a data assignment stored in contiguous memory locations; and
   calculating the number of timeslots associated with a set of data timeslots, wherein calculating the number of timeslots includes locating a start-point and an end-point of a set of data non-consecutive channels in a frame having the same assignment.

17. The system of claim 16, wherein the assignments include a voice timeslot, an unassigned timeslot, and a data timeslot.

18. The system of claim 17, wherein timeslots having a voice assignment or an unassigned timeslot separate the timeslots having a data assignment in the frame.

19. The system of claim 17, wherein storing the data comprises:
   storing the data included associated with voice timeslots in a first memory;
   storing the data associated with data timeslots in a second memory; and
   discarding the data associated with unassigned timeslots.

20. The system of claim 17, wherein storing the data comprises:
   storing the data associated with voice timeslots in a first subset of locations in the memory;
   storing the data associated with data timeslots in a first subset of locations in the memory; and
   discarding the data associated with unassigned timeslots.

21. The system of claim 16, wherein calculating the number of timeslots includes locating a start-point and an end-point of a set of data non-consecutive channels in a frame having the same assignment.

22. The system of claim 16, the operations further comprising storing the frames associated with a voice assignment in a memory in the order the frames are received.

23. The system of claim 16, the operations further comprising storing the frames associated with a voice assignment such that all voice assignment frames from a channel for a particular frame are stored contiguously.

* * * * *